No. 885,335. PATENTED APR. 21, 1908.
C. N. FREY.
CLUTCH.
APPLICATION FILED JULY 23, 1906.
2 SHEETS—SHEET 1.
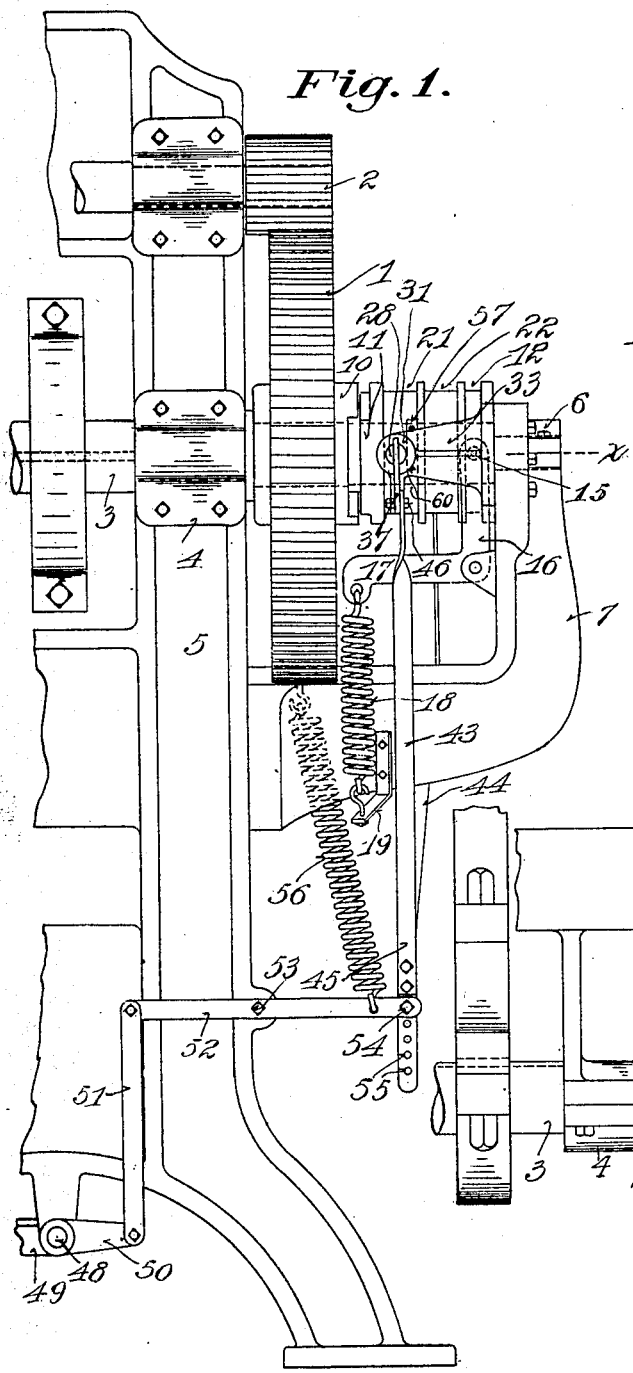
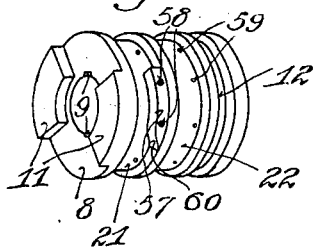
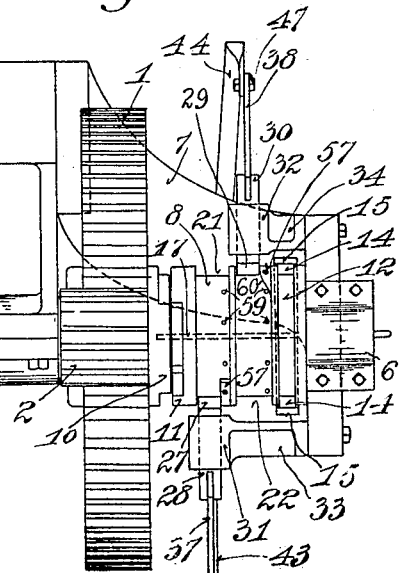
Witnesses.
Inventor.

No. 885,335. PATENTED APR. 21, 1908.
C. N. FREY.
CLUTCH.
APPLICATION FILED JULY 23, 1906.

2 SHEETS—SHEET 2.

Witnesses.
Inventor.

UNITED STATES PATENT OFFICE.

CLARENCE N. FREY, OF CINCINNATI, OHIO, ASSIGNOR TO THE J. M. ROBINSON MANUFACTURING COMPANY, OF CINCINNATI, OHIO, A CORPORATION OF OHIO.

CLUTCH.

No. 885,335.  Specification of Letters Patent.  Patented April 21, 1908.

Application filed July 23, 1906. Serial No. 327,333.

*To all whom it may concern:*

Be it known that I, CLARENCE N. FREY, a citizen of the United States, residing at Cincinnati, in the county of Hamilton and State of Ohio, have invented certain new and useful Improvements in Clutches, of which the following is a specification.

Figure 3:
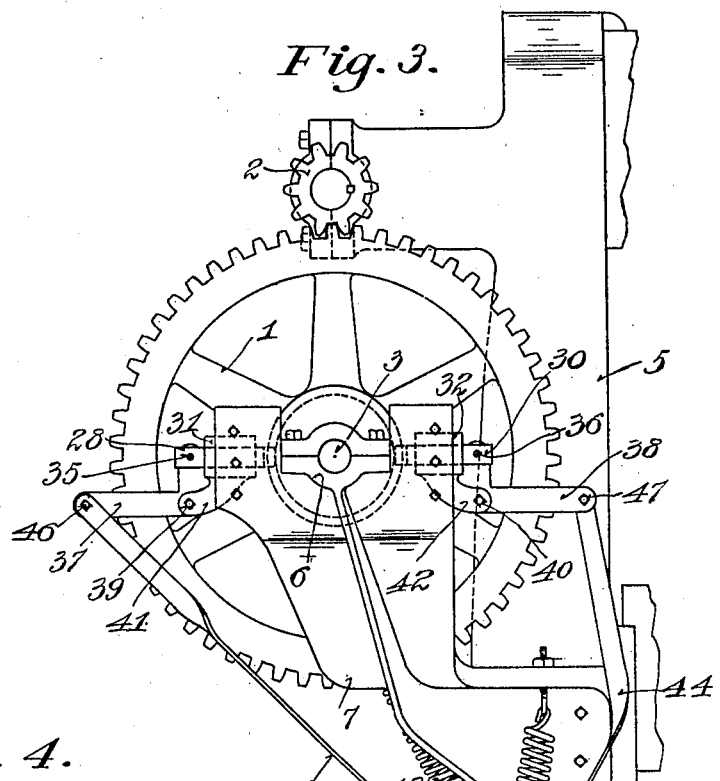
Figure 4:
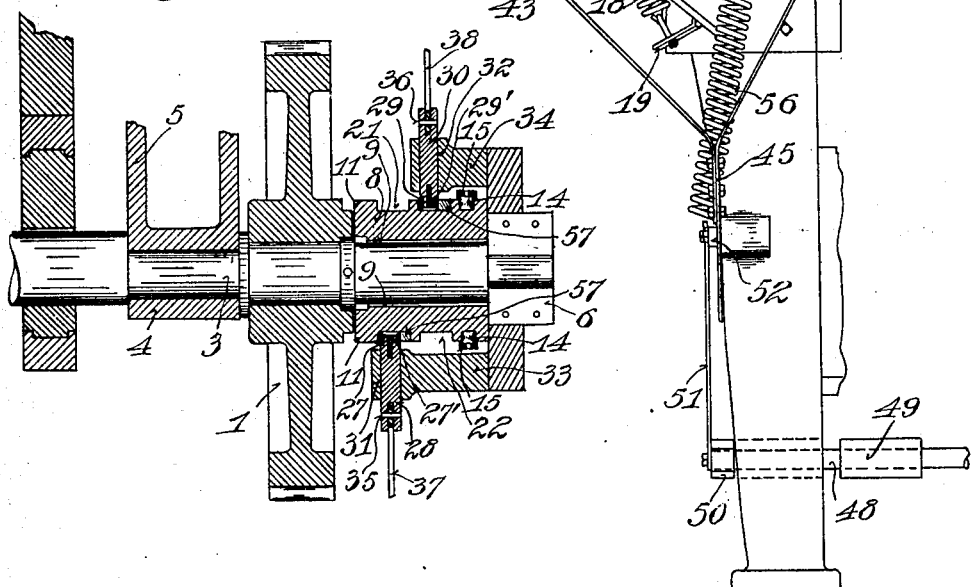

My invention relates to clutches and is especially applicable to employment on heavy corrugating or bending machines, toggle presses, and the like, where it is desirable to obtain great power and perform a single operation of the machine between clutch engagements, and the invention will be readily understood from the following description and claims, and from the drawings, in which latter:

Figure 1 is a side elevation of my improved device, showing its relation to a machine, the latter being broken away. Fig. 2 is a plan view of the same. Fig. 3 is an end elevation of the same. Fig. 4 is a detail in horizontal section on the line $x$ of Fig. 1; and, Fig. 5 is a perspective view of the clutch-sleeve.

1 represents the power member shown as a gear driven from a pinion 2.

3 is a driven shaft which is shown journaled in bearings 4 on the frame 5 of the machine and in a bearing 6 on a bracket 7 on the machine.

8 is a sleeve which slides longitudinally on the shaft but has rotative connection therewith by a spline 9. The power or driving member has driving teeth 10 forming a clutch face, and the sleeve has driven teeth 11, also forming a clutch-face. The said clutch-faces are normally out of contact but arranged to be engaged for the purpose of transmitting the power from the power member through the sleeve or driven member to the driven shaft. For normally urging the sleeve into engagement with the power member, I provide said sleeve or driven member with an annular groove 12 in which are located pins 14 at the ends of tines 15 of a bell-crank fork 16 to the arm 17 of which a spiral spring 18 is secured, the other end of the spring being secured to a lug 19 on the bracket 7. The spring normally forces the sleeve toward the power member for normally causing engagement between the teeth of the sleeve and the teeth of the power member, that is, normally engaging the clutch members. I provide the sleeve with a pair of annular grooves 21 22. A roll 27 is journaled on a pin 27' at the end of a bolt 28 and takes into the groove 21, and a roll 29 journaled on a pin 29' on the end of a bolt 30 and takes into the groove 22, the said rolls forming part of said bolts, the respective bolts having sliding engagement in bearings 31 32 respectively on supplemental brackets 33 34 on the bracket 7. These bolts are located at the respective sides of the sleeve 8 for equalizing the pressure upon said sleeve and preventing tilting or binding action of the sleeve upon its shaft when the sleeve is moved longitudinally of the shaft. For normally pressing said bolts 28 30 toward the sleeve, I pivot their respective ends at 35 36 (see Figs. 3 and 4) to bell-crank levers 37 38 pivoted respectively at 39 40 to lugs 41 42 of the respective brackets 33 34. The tines 43 44 of a bifurcated bar 45 are pivoted respectively at 46 47 to said respective levers 37 38. 48 is a rock-shaft to which a treadle 49 or other suitable operating device is adapted to be secured.

An arm 50 extends from the rock-shaft and has pivotal connections with a link 51 which is pivoted to a lever 52, which latter is pivoted on a bolt 53 to the frame of the machine and has pivotal connection with the bifurcated bar 45 by means of a pin 54 taking through an aperture in the end of said lever and selectively taking into a series of apertures 55 in the lower end of said bifurcated bar. A spring 56 is secured to the outer end of the lever 52 and to the bracket 7 for normally raising said bifurcated bar and pressing the bolts 28 30 toward the sleeve 8. The sleeve is provided with shoes 57 which may be adjustably secured about the periphery of the sleeve by means of screws 58 selectively threaded into threaded apertures 59 in the sleeve. These shoes have inclined engaging faces 60 which are adapted to make engagement with the rolls 27 29 of the bolts 28 30 for forcing the sleeve outwardly away from the power member.

In operation, if it is desired to bring the clutch members into engagement for operating the machine, the treadle is depressed, which forces the bolts 28 30 outwardly beyond the peripheries of the shoes 57. The spring 18 immediately causes longitudinal movement of the sleeve 8 toward the power member and causes engagement of the clutch members for driving the sleeve and rotating the shaft 3 with the sleeve 8 and the power member. As soon as the treadle is released, the spring 56 will cause retraction of the bolts 28 30, the inner ends of said bolts again taking into said respective grooves 21 22. As soon as, in the rotation of the sleeve, the inclined faces 60 reach the rolls 27 29 on the bolts 28 30 they will ride said rolls and consequently draw the sleeve longitudinally away from the power member and thereby release engagement between the clutch members, when the machine is instantly brought to rest. The shoes are adjustable about the periphery of the machine in order that the operation of the machine may be initiated at different points about the periphery of the driven member.

Having thus fully described my invention what I claim as new and desire to secure by Letters Patent is:

1. In a clutch, the combination of a driving member and a driven member having clutch-faces therebetween, means for moving one of said members axially, said last-named member having a plurality of annular grooves, a bolt taking into each of said grooves, a shoe in each of said grooves, the bolt and shoe in each of said grooves having an inclined engaging face between them, and means for retracting said bolts, said bolts being equidistantly arranged about the periphery of said last-named member and simultaneously and collectively acting on said shoes, substantially as described.

2. In a clutch, the combination of a driven shaft, a driving member rotatable about said shaft, a sleeve rotatably secured to and longitudinally movable with relation to said shaft, said driving member and sleeve having engaging clutch-faces and said sleeve having a plurality of annular grooves, a moving member for normally causing engagement of said clutch-faces taking into one of said grooves, a plurality of bolts taking into others of said grooves and arranged equidistantly about the rotary axis thereof, shoes having inclined engaging faces secured equidistantly about the rotary axis of said sleeve in said other grooves making engagement with the sides of said bolts simultaneously from a plurality of equidistantly arranged points, and means for moving said bolts longitudinally out of range of said shoes for causing engagement of said clutch-faces, substantially as described.

3. In a clutch, the combination with a driven shaft, a power member rotating about said shaft, a sleeve rotatively secured to and longitudinally slidable with relation to said shaft, said sleeve and power-member having engaging clutch-faces, said sleeve having three annular grooves, a moving member for moving said sleeve endwise taking into one of said grooves, an endwise movable bolt taking into each of the others of said grooves, said bolts arranged equidistantly about the rotary axis of said sleeve, a shoe in each of said last-named grooves, said shoes arranged equidistantly about the rotary axis of said sleeve, the shoe and bolt in each of said grooves having an inclined engaging face between them, and constructed for moving said sleeve longitudinally simultaneously from a plurality of points about its rotary axis, means for normally holding said bolts in said grooves, and means for retracting said bolts simultaneously, substantially as described.

4. In a clutch, the combination of a driven shaft, a driving member rotatable about said shaft, a sleeve rotatably secured to and longitudinally movable with relation to said shaft, said driving member and sleeve having engaging clutch-faces, and said sleeve having a plurality of annular grooves, shoes in said grooves, means for securing said shoes in said grooves at different positions about the periphery of said sleeve, bolts taking into said grooves, said bolts and shoes arranged equidistantly about the rotary axis of said sleeve and respectively having an engaging inclined face between them, means for normally pressing said sleeve toward said driving member, means for normally forcing said bolts simultaneously into said grooves, for simultaneously moving said sleeve longitudinally from a plurality of points equidistantly located about its rotary axis and means for retracting said bolts, substantially as described.

In testimony whereof, I have signed my name hereto in the presence of two subscribing witnesses.

CLARENCE N. FREY.

Witnesses:
 HENRY N. BAUER,
 CORDELIA O'HEARN.